US012116243B2

(12) United States Patent
Bumann et al.

(10) Patent No.: US 12,116,243 B2
(45) Date of Patent: Oct. 15, 2024

(54) SLIDING GUIDE SHOE FOR AN ELEVATOR

(71) Applicant: Inventio AG, Hergiswil (CH)

(72) Inventors: Patrick Bumann, Eschenbach (CH); Volker Zapf, Kriens-Obernau (CH)

(73) Assignee: INVENTIO AG, Hergiswil (CH)

(*) Notice: Subject to any disclaimer, the term of this patent is extended or adjusted under 35 U.S.C. 154(b) by 0 days.

(21) Appl. No.: 17/907,285

(22) PCT Filed: Mar. 26, 2021

(86) PCT No.: PCT/EP2021/057979
§ 371 (c)(1),
(2) Date: Sep. 26, 2022

(87) PCT Pub. No.: WO2021/198091
PCT Pub. Date: Oct. 7, 2021

(65) Prior Publication Data

US 2023/0111169 A1 Apr. 13, 2023

(30) Foreign Application Priority Data

Mar. 31, 2020 (EP) .................................... 20167359

(51) Int. Cl.
*B66B 7/04* (2006.01)

(52) U.S. Cl.
CPC .................................... *B66B 7/047* (2013.01)

(58) Field of Classification Search
CPC ............ B66B 7/047; B66B 7/048; B66B 7/04
See application file for complete search history.

(56) References Cited

U.S. PATENT DOCUMENTS 2,045,620 A * 6/1936 Spullies .................. B66B 7/047 187/409
4,271,932 A 6/1981 Klein
4,598,798 A * 7/1986 Koppensteiner ........ B66B 7/048 187/409
4,652,146 A * 3/1987 Ellermann .............. F16C 29/02 384/39
4,716,991 A * 1/1988 Riechers ............... F16C 29/005 384/38
10,207,897 B2 * 2/2019 Hess ..................... B66B 19/007
2008/0017457 A1 * 1/2008 Ach ........................ B66B 7/047 29/700
2015/0239710 A1 * 8/2015 Det ......................... B66B 7/047 187/409

FOREIGN PATENT DOCUMENTS

CN 101108709 A 1/2008
CN 103922209 A 7/2014
CN 104326333 A 2/2015
CN 104718149 A 6/2015
DE 20315915 U1 3/2005
DE 202006004593 U1 * 9/2007 ............. B66B 7/047

(Continued)

*Primary Examiner* — Michael R Mansen
*Assistant Examiner* — Michelle M Mudwilder
(74) *Attorney, Agent, or Firm* — William J. Clemens; Shumaker, Loop & Kendrick, LLP

(57) ABSTRACT

A sliding guide shoe for an elevator includes a guide shoe housing and a two-part insert inserted into the guide shoe housing. The insert includes a damping element and a sliding element for guiding an elevator car or a counterweight.

16 Claims, 3 Drawing Sheets

(56) References Cited

FOREIGN PATENT DOCUMENTS

| | | | | | |
|---|---|---|---|---|---|
| DE | 202007012729 | U1 * | 3/2009 | ............. | B66B 7/047 |
| EP | 3042873 | A1 * | 7/2016 | ............... | B66B 7/04 |
| FR | 2505806 | A3 * | 11/1982 | | |
| JP | S59165837 | U | 11/1984 | | |
| JP | S59165873 | U | 11/1984 | | |
| JP | S6256580 | U | 4/1987 | | |
| JP | S62100388 | A | 5/1987 | | |
| JP | H05193866 | A * | 8/1993 | | |
| JP | 2008007248 | A * | 1/2008 | ............. | B66B 7/047 |
| WO | WO-2011070237 | A1 * | 6/2011 | ............. | B66B 7/047 |

* cited by examiner

SLIDING GUIDE SHOE FOR AN ELEVATOR

FIELD

The invention relates to a sliding guide shoe for an elevator for transporting people or goods.

BACKGROUND

Sliding guide shoes are often used to guide elevator cars. Elevator installations in buildings generally have a vertical elevator shaft in which one guide rail is arranged on each of the shaft walls situated opposite one another. Sliding guide shoes arranged on the elevator car or on the counterweight have sliding surfaces facing the guide rail, which surfaces slide along the guide rail with little play. Known and used are sliding guide shoes that have sliding elements with sliding surfaces, wherein the sliding elements are often configured as profiles with a U-shaped cross section.

For example, DE 203 15 915 U1 discloses a sliding guide shoe with a guide shoe housing and an insert which is configured in two parts with a sliding element and a damping element and is inserted in the guide shoe housing.

For the linear guidance of the elevator car or the counterweight, a plurality of guide rails lined up next to one another are necessary. In practice, in the transition region between the rails, undesirable rail joints, i.e., non-homogeneous transitions at the beginning and end of the guide rails, can occur which lead to undesirable vibrations and thus impair traveling comfort. Such rail joints are particularly problematic in the case of guide rails bent from sheet metal, because—after assembly—they cannot be reworked mechanically, or they can be reworked mechanically only with great effort. If the sliding guide shoe runs over a threshold at the rail joint, there is an impact on the car or the counterweight. Rail joints have a negative effect on the service life of the sliding guide shoes, because some material can be removed from the sliding element of the sliding guide shoe when it travels over a rail joint.

SUMMARY

It is an object of the present invention to avoid the disadvantages of what is known and in particular to provide a sliding guide shoe of the type mentioned at the outset, which that is able to cope with rail joints.

This object is achieved according to the invention by the sliding guide shoe having the features described below. The sliding guide shoe for an elevator for transporting people or goods comprises a guide shoe housing and a sliding element. The sliding element of the sliding guide shoe for guiding an elevator car or a counterweight can be inserted in the guide shoe housing or be connected thereto in some other way. The guide shoe housing serves on the one hand to hold the sliding element and on the other hand to connect it to the elevator car or to the counterweight. For the connection to the elevator car or the counterweight or to a console as an intermediate element, the guide shoe housing has openings, for example, through which mounting bolts can be passed, with which bolts the guide shoe housing can be bolted to the car or to the counterweight.

The guide shoe housing can comprise a channel-like receptacle in which the sliding element, which is preferably designed as a profile with a U-shaped cross section at least in the inserted state, is or can be inserted. To form the aforementioned channel-like receptacle, the guide shoe housing can have two parallel running side wall portions situated opposite one another and a bottom portion connecting the side wall portions. The bottom portion and the side wall portions projecting away from the bottom portion at right angles form a "U" in section. The guide shoe housing can thus be formed by a U-shaped profile. However, the guide shoe housing can also have other shapes. However, it is thus also possible for the guide shoe housing to use the common form which is known, for example, from DE 203 15 915 U1, comprising a plate-like housing base and the two side wall portions which project away from the housing base approximately centrally and form a groove for forming the channel-like receptacle. The guide shoe housing can be made of a metallic material (e.g., steel). It is also conceivable to manufacture the guide shoe housing from a high-strength plastics material, for example PE, PP, PA, PS, PES, POM, PEEK, TPEs or a fiber-reinforced plastics material.

The sliding element can be slid along a guide rail extending in the direction of travel or the longitudinal direction for vertically guiding the elevator car or the counterweight. The sliding element has upper and lower ends when the sliding guide shoe is installed in the elevator and is ready for operation, for example in an operating position. Due to the fact that at least one and preferably each of the upper and lower ends along the respective ends have a non-horizontal course, a hard and abrupt impact can be avoided, for example when the sliding guide shoe travels over a threshold at the rail joint. The sliding guide shoe is particularly suitable for guide rails bent from sheet metal, with which undesired rail joints can often occur. A low-vibration and low-noise travel of the car can thus be efficiently ensured even in the case of rail joints. In addition, thanks to the special configuration of the sliding element, the service life of the sliding guide shoe can again be extended considerably.

The aforementioned non-horizontal course of the upper or lower end can relate in particular to the region of an associated edge at the upper or lower end of the sliding element that is forwardmost with respect to the longitudinal direction. The course of the upper or lower end can extend from a vertical longitudinal edge (as the starting point) of the sliding element to an opposing longitudinal edge of the sliding element (as the end point). The starting point and end point are thus located on planes assigned to side legs of the U-shaped sliding element, which side legs are situated opposite one another.

In other words, the course of the upper and lower ends is evident from the unfolding of the sliding element. This unfolding is to be understood as unfolding in the geometric sense. It can be an actual or just a virtual unfolding of the sliding element. The actual unfolding relates to elements which, due to their flexibility (e.g., due to a foldable configuration), can be placed flat on one plane; virtual unfolding is necessary for elements having rigid structures that cannot be laid down non-destructively or otherwise easily on a plane.

Conventional sliding guide shoes have sliding elements which, when unfolded, i.e., when they are unfolded onto a plane in the geometric sense, have upper and lower ends running horizontally or at right angles to the longitudinal direction. In contrast, the sliding element of the sliding guide shoe according to the invention has upper and lower ends which have a non-horizontal course when unfolded.

In a first embodiment, the upper and/or lower ends of the sliding element can each have, at least in parts, a preferably consistently sloping course along the respective ends. The portions can be defined by the legs of the sliding element, which form a "U." Instead of a straight sloping course, curved courses of the ends would also be conceivable.

Preferably, the sloping upper and/or lower ends of the sliding element can form, at least in parts, an angle of inclination relative to the horizontal when the sliding guide shoe is installed in the elevator.

Particularly preferably, for a smooth behavior when traveling over rail joints, the angle of inclination can be between 5° and 45°, preferably between 10° and 30° and particularly preferably about 17°.

At least in the operating position, the sliding element can be designed as a U-shaped profile having two preferably parallel running side legs situated opposite one another and base legs situated between them and in particular connecting them to one another. It is then advantageous if the associated side-leg-side portions and the associated base-leg-side portion of the at least one of the upper and lower ends of the sliding element each have the same slopes.

For easy handling, it can be advantageous if the sliding element having two side legs and a base leg connecting them to one another is configured to be foldable, wherein the respective side legs are connected to the base leg via a film hinge.

The sliding element can be shaped in such a way that its unfolded form has a parallelogram-shaped outer contour without any right angles, in particular when the sliding element configured to be foldable is spread out or laid down on a plane.

In a further embodiment, the sliding element can have a base leg which has an inner side with a round cross section (the sectional plane is a horizontal plane or runs perpendicularly to the longitudinal direction). A sliding element formed in this way is particularly suitable for special rail geometries formed from sheet metal. For example, the sliding guide shoe assigned to the elevator car or the counterweight can have a groove for guiding, which groove surrounds a blade of a guide rail that is assigned to the elevator shaft. This blade can be an extension of a profile. This blade can, for example, be a closed fold created by sheet metal bending processes, which fits optimally into the round inner side of the base leg.

With regard to traveling comfort and service life, it can be advantageous if at least one of the upper and lower ends of the sliding element has rounded ramp surfaces at least in the side-leg-side portions.

To optimize traveling comfort, it is advantageous if the sliding element is a component of a two-part insert, wherein the insert has a damping element which is arranged between sliding element and guide shoe housing. For example, an elastic plastics material, in particular a thermoplastic elastomer (TPE) or a plastics material made from crosslinked elastomers, can be used for the damping element. The damping element can be made of SBR, TUR, TPU, EPDM, NBR, NR, for example. The damping element can then also be made of a foamed material. The damping element already has damping properties attributable to appropriate material selection, thereby facilitating low-vibration and low-noise travel of the car. The damping element can preferably be configured as a U-shaped profile.

To further optimize traveling comfort, it can be particularly advantageous if the sliding element has at least one retaining cam which is received or can be received in a hole provided in the region of an annular buffer element. The annular buffer element can form a pin that engages in a bore in the guide shoe housing. This pin can have a profiled configuration. The at least one pin can have, in particular on its outside, radially outwardly pointing ribs or webs distributed evenly over the circumference.

DESCRIPTION OF THE DRAWINGS

Additional advantages and individual features of the invention are made evident from the following description of an embodiment and from the drawings, in which.

DETAILED DESCRIPTION

Figure 1:
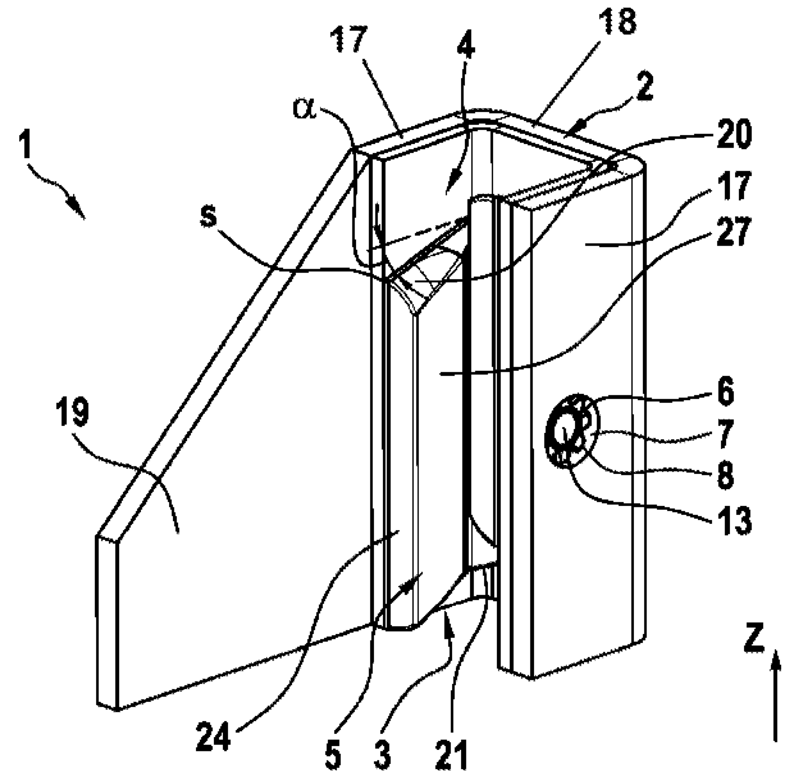
FIG. 1 is a perspective view of a sliding guide shoe according to the invention.

FIG. 1 shows a sliding guide shoe, designated with 1, for an elevator (not shown here) for transporting people or goods. The elevator can be an elevator car which is vertically guided between two guide rails (not shown) serving as linear guides and can be moved up and down in an elevator shaft in the z-direction Z. At least the sliding guide shoe, described in detail below, for guiding the car can be arranged on each side of the car. For optimal guidance, elevator cars usually have four (two per side) or more sliding guide shoes. Likewise, a counterweight (likewise not shown), which is connected to the car via suspension means in the form of ropes or belts, can have these sliding guide shoes for guiding the counterweight on counterweight guide rails.

The sliding guide shoe assigned to the elevator car or the counterweight can have a groove for guiding, which groove surrounds a blade of a guide rail assigned to the elevator shaft. This blade can be an extension of a profile. The sliding guide shoe described in detail below is designed for a guide rail formed from sheet metal. The groove of the sliding guide shoe surrounds a relatively narrow blade which is, for example, a closed fold created by sheet metal bending processes. However, the guide rail could also be formed by a T-profile. The T-profile can be, for example, a fully walled steel profile made by rolling. The guide rail can also consist of or have other metallic materials (e.g., aluminum), manufacturing processes or profile shapes. For example, metal profiles manufactured by extrusion can be used as guide rails.

As can be seen from FIG. 1, the sliding guide shoe 1 comprises a guide shoe housing 2 having a one-piece configuration and an insert 3 inserted therein. The insert 3 is designed in two parts and has a sliding element 5 facing the guide rail as the inner insert part and a damping element 4 as the outer insert part. The sliding element has sliding surfaces or sliding regions that slide along the guide rail with little play when the car is traveling. A planar sliding surface designated with 27 can be seen in FIG. 1.

The sliding element 5 has an upper end 20 and a lower end 21 when the sliding guide shoe 1 is installed in the elevator ready for use. The upper and lower ends 20, 21 are connected to one another by longitudinal edges 24 running vertically or in the z-direction. Both the upper and the lower end 20, 21 each have a non-horizontal course along the associated end. The aforementioned course along the upper end 20 extends in an upwardly sloping manner starting from the longitudinal edge 24, which defines a starting point indicated with S, up to an end point at the opposing longitudinal edge (cf. FIG. 3 below, in which the aforementioned end point is indicated with E). The lower end 21 has a similar sloping course. The angle of inclination which is formed by the sloping upper lower end 20 of the sliding element 5 relative to the horizontal is denoted by α. The angle of inclination α can also be between 5° and 45°, and preferably between 10° and 30°. In the present embodiment, the angle of inclination α is 17°, at which angle of inclination a particularly low-vibration and low-noise travel of the elevator car can be efficiently ensured even in the case of unfavorable rail joints. A further advantage of the sliding element 5 is that the sliding element is characterized by optimized wear behavior, especially when used on guide rails with little or no oil and in particular with sheet metal rails.

The sliding element 5 is, for example, made of a plastics material that is characterized by a low coefficient of friction such as PTFE, UHMW-PE. In addition, preference should be given to a material for the sliding element 5, which is characterized by a low stick-slip tendency, i.e., a small or minimal difference between sliding and static friction.

For example, an elastic plastics material, in particular a thermoplastic elastomer (TPE) or a plastics material made from crosslinked elastomers, can be used for the damping element 4. The damping element 4 can be made from SBR, TUR, TPU, EPDM, NBR, NR, for example. For specific applications, it is also conceivable to use foamed plastics materials for the damping element 4. It should also be noted that materials are preferably used for the damping element 4, which are stable against the frequently used rail oil.

The guide shoe housing 2, in whose channel-like receptacle forming the aforementioned groove the insert 3 is inserted, is connected to the elevator car or the counterweight. In the present embodiment according to FIG. 1, the guide shoe housing 2 is designed as a relatively simple metal profile with a U-shaped cross section.

The guide shoe housing 2 has two parallel running side wall portions 17 situated opposite one another and a bottom portion 18 connecting the side wall portions. The bottom portion and the side wall portions projecting away from the bottom portion at right angles form a "U," as can be seen in section. In the embodiment according to FIG. 1, it is further illustrated by way of indication and example that one of the side wall portions 17 is extended to form an attachment region 19 with regard to the connection to the elevator car or to the counterweight. However, instead of the simple U-profile shape, the guide shoe housing could also have other shapes; for example housing shapes as are known and familiar to a person skilled in the art, for example from DE 203 15 915 U1.

In order to secure the insert 3 in terms of position, the guide shoe housing 2 has two bores 7 which are situated opposite one another and are arranged in the parallel running side wall portions 17 of the guide shoe housing, in each of which the associated pins 6 engage. The pin 6 consists of an annular buffer element 8 assigned to the damping element 4 and of a retaining cam 13 assigned to the sliding element 5, wherein the retaining cam 13 is received within a hole, designated with 12 in FIG. 2, in the buffer element 8. The buffer element 8 of the pin 6 has a profiled outer contour that is created by raised points and forms a star. The vibration isolation achieved with these profiled pins 6 can again significantly improve traveling comfort.

Figure 2:
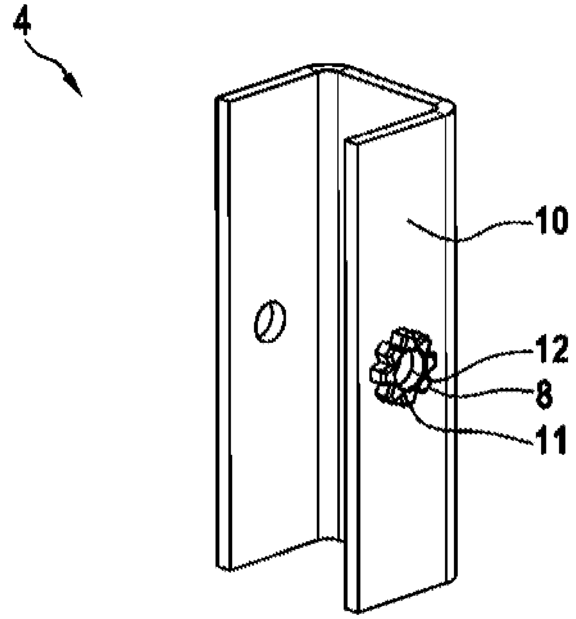
FIG. 2 shows a damping element of the sliding guide shoe according to FIG. 1 in an enlarged perspective view.

It can be seen from FIG. 2 that the damping element 4 has a U-shaped profile body 10. Two annular buffer elements 8 are integrally formed on the profile body 10 and form a one-piece, monolithic component therewith. The associated buffer element 8 has a star-shaped cross section to form the profiling. The profiling of the pin 6, which extends with the pin in an axial direction, has webs 11 which are distributed evenly over the circumference and point radially outward.

Figure 3:
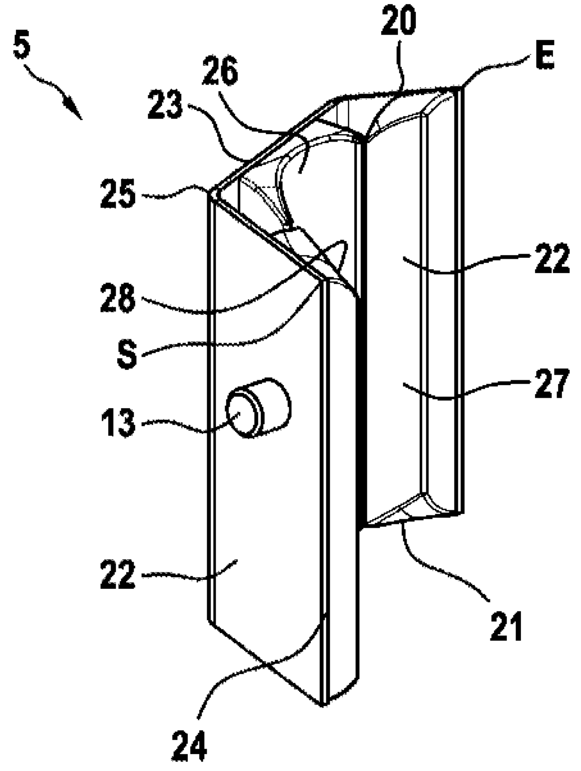
FIG. 3 shows a sliding element of the sliding guide shoe according to FIG. 1 in an enlarged perspective view but from a different viewing direction and in a slightly unfolded state.
Figure 4:
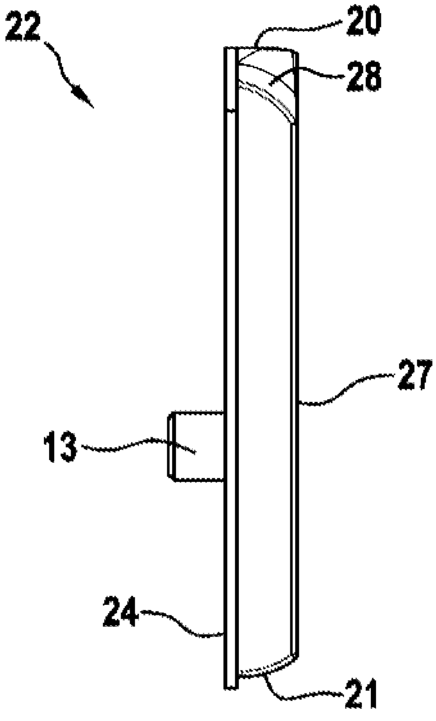
FIG. 4 is a side view of a side leg of the sliding element.
Figure 5:
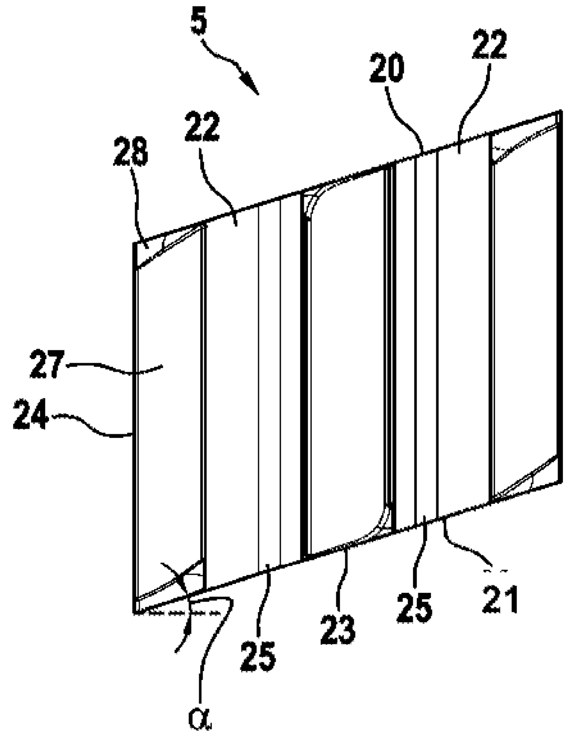
FIG. 5 is a top view of the sliding element laid down on a plane.

Details on the configuration of the sliding element 5 can be found in FIGS. 3 to 5. As can be seen from FIG. 3, the sliding element 5 is designed as a U-shaped profile, at least in the operating position, having two side legs 22 situated opposite one another and a base leg 23 connecting them to one another. The sliding element 5 is configured to be foldable. The side legs 22 are each hinged to the base leg 23 via film hinges 25. FIG. 3 shows the sliding element 5 in a position before it is inserted into the damping element 4 or before it is installed in the guide shoe housing. In this position, the sliding element 5 is still slightly folded out as compared to when it is in the operating position; i.e., after installation, the side legs 22 run parallel to one another. The retaining cams 13 of the sliding element 5 are configured as solid cylinders.

The sliding element 5 is configured as a one-piece plastics material part that can be easily manufactured using injection molding processes. Of course, other manufacturing processes are also possible. For example, it is conceivable to produce the sliding element 5 in an additive method (e.g., 3D printing). Machining production methods (especially for sliding elements made of UHMPE, for example) can also be considered. For example, it may be advantageous to first produce sliding elements using the injection molding method and then partially or completely rework them. Thanks to this post-processing, the sliding surfaces can be manufactured precisely, which means that the running-in behavior can be accelerated and the elevator has better riding comfort right from the start.

The sliding element 5 has a base leg 23 which has an inner side 26 that has a round cross section and faces an end face of the guide rail to create an optimal sliding surface for rounded guide rails. The sliding surfaces 27 on the side-leg-side 22 that are situated next to the inner side 26 have a flat design.

The upper and lower ends 20, 21 of the sliding element 5 have rounded ramp surfaces 28 in the side-leg-side portions. FIG. 4 shows such a round ramp surface 28 facing the guide rail at the upper end 20 of the sliding element.

FIG. 5 shows the sliding element 5 after the sliding element 5 configured to be foldable has been spread out or laid down on a plane. As can be seen, the sliding element 5 is formed in such a way that it has a parallelogram-shaped outer contour without any right angles. Instead of the parallelogram shape shown, other outer contour shapes would also be conceivable under certain circumstances. For example, the side-leg-side portions and the base-leg-side portion of the upper and lower ends 20, 21, respectively, could have different slopes. The alignment of the slopes for the side legs 22 and/or base legs 23 could also be different. Thus, when the sliding element 5 is spread out or laid down on a plane, it could have slopes running toward one another in the side-leg-side portions. An arrow-like structure is conceivable. The central portion, i.e., the portion of the upper and/or lower end 20, 21 of the sliding element 5 assigned to the base leg 23, could even have a horizontal course.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A sliding guide shoe for an elevator for transporting people or goods, the sliding guide shoe comprising:

a guide shoe housing;

a sliding element arranged in the guide shoe housing and having opposite ends, where the sliding element has two opposing side legs connected by a base leg each having a sliding surface arranged proximal an elevator guide rail;

wherein, when the sliding guide shoe is installed in the elevator, the side legs are oriented vertically and the opposite ends are oriented as an upper end and a lower end of the sliding element; and wherein at least one of the upper end and the lower end extends in a non-horizontal course such that the sliding surfaces of the two opposing side legs have vertical extents which are asymmetrical across a vertical plane parallel to the sliding surfaces of the side legs.

2. The sliding guide shoe according to claim 1 wherein at least one of the upper end and the lower end of the sliding element has a sloping course.

3. The sliding guide shoe according to claim 2 wherein the sloping course, at least in parts, forms an angle of inclination relative to a horizontal direction.

4. The sliding guide shoe according to claim 3 wherein the angle of inclination is between 5° and 45°.

5. The sliding guide shoe according to claim 3 wherein the angle of inclination is between 10° and 30°.

6. The sliding guide shoe according to claim 3 wherein the angle of inclination is approximately 17°.

7. The sliding guide shoe according to claim 2 wherein the sliding element is formed as a U-shaped profile having the side legs running parallel and positioned opposite one another, the side legs and the base leg each having portions forming the upper end and the lower end of the sliding element, the portions forming at least one of the upper end and the lower end having a same slope.

8. The sliding guide shoe according to claim 7 wherein at least one of the upper end and lower end of the sliding element has rounded ramp surfaces at least in the portions of the side legs.

9. The sliding guide shoe according to claim 1 wherein the side legs each are connected to the base leg by a film hinge such that the side legs and the base leg are foldable relative to one another.

10. The sliding guide shoe according to claim 1 wherein the sliding element is shaped such that in an unfolded form the sliding element has a parallelogram-shaped outer contour without any right angles when the sliding element spread out or laid down on a plane.

11. The sliding guide shoe according to claim 1 wherein the sliding surface of the base leg has a round cross section.

12. The sliding guide shoe according to claim 1 wherein the guide shoe housing has a bore engaged by a pin, the sliding element has at least one retaining cam included in the pin engaging in the bore in the guide shoe housing, and the pin having a profiled outer contour of raised points.

13. The sliding guide shoe according to claim 1 wherein the sliding element is a component of a two-part insert, the insert having a damping element arranged between the sliding element and the guide shoe housing.

14. The sliding guide shoe according to claim 13 wherein the guide shoe housing has a bore engaged by a pin, the pin includes an annular buffer element formed in the damping element and a retaining cam included in the sliding element, the retaining cam being received in a hole in the annular buffer element, the annular buffer element having a profiled outer contour of raised points.

15. A sliding guide shoe for an elevator for transporting people or goods, the sliding guide shoe comprising:

a guide shoe housing;

an insert arranged in the guide shoe housing;

wherein the insert includes a sliding element having opposite ends and a damping element, where the sliding element has two opposing side legs connected by a base leg each having a sliding surface arranged proximal an elevator guide rail, and where the damping element is arranged between the sliding element and the guide shoe housing;

wherein, when the sliding guide shoe is installed in the elevator, the side legs are oriented vertically and the opposite ends are oriented as an upper end and a lower end of the sliding element; and wherein at least one of the upper end and the lower end extends in a non-horizontal course such that the sliding surfaces of the two opposing side legs have vertical extents which are asymmetrical across a vertical plane parallel to the sliding surfaces of the side legs.

16. A sliding guide shoe for an elevator for transporting people or goods, the sliding guide shoe comprising:

a guide shoe housing;

a sliding element arranged in the guide shoe housing and having opposite ends connected to one another by longitudinal edges, the sliding element having two opposing side legs connected by a base leg each having a sliding surface arranged proximal an elevator guide rail;

wherein, when the sliding guide shoe is installed in the elevator, longitudinal edges are oriented vertically and the opposite ends are oriented as an upper end and a lower end of the sliding element; and wherein at least one of the upper end and the lower end extends in a non-horizontal course such that a continuous edge of the sliding surface at the at least one end, along one of the side legs, the base leg and the opposing side leg, is not horizontal.

* * * * *